(12) United States Patent
Schuster

(10) Patent No.: US 10,064,389 B2
(45) Date of Patent: Sep. 4, 2018

(54) ANTI-STATIC GROOMING DEVICE

(71) Applicant: Barbara Schuster, Perkasie, PA (US)

(72) Inventor: Barbara Schuster, Perkasie, PA (US)

(*) Notice: Subject to any disclaimer, the term of this patent is extended or adjusted under 35 U.S.C. 154(b) by 0 days.

(21) Appl. No.: 14/274,613

(22) Filed: May 9, 2014

(65) Prior Publication Data

US 2016/0037750 A1    Feb. 11, 2016

Related U.S. Application Data

(60) Provisional application No. 61/855,165, filed on May 10, 2013.

(51) Int. Cl.
| | |
|---|---|
| *A01K 13/00* | (2006.01) |
| *A01K 29/00* | (2006.01) |
| *A46B 5/04* | (2006.01) |
| *A46B 15/00* | (2006.01) |

(52) U.S. Cl.
CPC ............ *A01K 13/002* (2013.01); *A01K 29/00* (2013.01); *A46B 5/04* (2013.01); *A46B 15/002* (2013.01)

(58) Field of Classification Search
CPC ......... A46B 15/002; A46B 15/04; A46B 5/04; A46B 2200/1093; A01K 29/00; A01K 15/02; A01K 13/001; A01K 13/00; A01K 13/002; A47L 13/18; A47L 23/10
USPC ....... 119/633, 652, 614; 601/137, 74; 2/158, 2/168, 160, 159, 161, 162, 163, 164, 165, 2/166, 167, 169; 15/227, 160; 401/7
See application file for complete search history.

(56) References Cited

U.S. PATENT DOCUMENTS

| | | | | |
|---|---|---|---|---|
| 277,173 | A * | 5/1883 | Thompson | 119/612 |
| 2,036,413 | A * | 4/1936 | Herbruck | A41D 19/0062 174/5 SB |
| 2,717,799 | A * | 9/1955 | Jones | A41D 13/087 2/21 |
| 4,769,856 | A * | 9/1988 | Reed | A41D 19/00 2/167 |
| 5,590,420 | A * | 1/1997 | Gunn | A41B 11/00 2/239 |
| 5,682,837 | A * | 11/1997 | Courtney | A46B 5/04 119/625 |

(Continued)

FOREIGN PATENT DOCUMENTS

| | | | | |
|---|---|---|---|---|
| EP | 2676544 A1 * | 12/2013 | | A01K 13/001 |
| WO | WO 9800048 A1 * | 1/1998 | | A46B 3/10 |

*Primary Examiner* — Peter M Poon
*Assistant Examiner* — Jeffrey R Larsen
(74) *Attorney, Agent, or Firm* — Douglas J. Ryder; Ryder, Mazzeo & Konieczny LLC

(57) ABSTRACT

A grooming device for animals includes a glove and one or more grooming pads affixed (possibly molded) thereto. The glove is made from anti-static material, and may additionally be treated with a spray or solution, that is resistant to electrostatic accumulation and discharge caused by friction during the grooming process. The grooming pads include multiple protrusions that are used to cling to and collect extraneous debris and hair from the animal's body and coat. Due to the materials and the placement of the molded pad, the glove facilitates hand movement dexterity and reach. The device also allows the user increased tactility between the thumb and index finger by keeping them free of coverage by the grooming surface. The device may include a soft material on the back of the glove for grooming and brushing sensitive areas of the animal's coat.

20 Claims, 4 Drawing Sheets

(56) References Cited

U.S. PATENT DOCUMENTS

| | | | | |
|---|---|---|---|---|
| 7,886,698 B2* | 2/2011 | Leonard | ............... | A01K 13/002 |
| | | | | 119/174 |
| 2007/0277288 A1* | 12/2007 | Sing | ........................ | A46B 5/04 |
| | | | | 2/159 |
| 2008/0178366 A1* | 7/2008 | Daher | ..................... | A47L 13/18 |
| | | | | 2/161.6 |
| 2008/0306200 A1* | 12/2008 | Chen | .................... | C09D 109/04 |
| | | | | 524/418 |
| 2008/0313788 A1* | 12/2008 | Yan | ........................ | A46B 5/04 |
| | | | | 2/158 |

\* cited by examiner

ANTI-STATIC GROOMING DEVICE

PRIORITY

This application claims the priority under 35 USC § 119 of Provisional Application 61/855,165 filed on May 10, 2013, entitled "Anti-static grooming device" and having Barbara Schuster as inventor. Application 61/855,165 is herein incorporated by reference in its entirety.

BACKGROUND OF THE INVENTION

Animal grooming is necessary to undertake for any animal owner or caretaker. Proper and complete grooming of an animal not only contributes to the animal's health, hygiene, and behavior by ridding its coat of foreign debris, but also provides beneficial secondary health benefits to those who care or spend time with the animal. Animal grooming may prove to be difficult, however, when the animal moves about or attempts escape due to discomfort or pain during the grooming process, typically as a result of flawed grooming brushes and devices. In turn, the likelihood of injury to the animal and animal handler is increased by virtue of those ineffective grooming devices. The animal may also develop a negative association with the grooming process due to its discomfort in detriment to future grooming attempts and the overall health of the animal.

There are several grooming devices known in the art that are flawed in various respects. First, many of the known grooming devices have a tendency to generate a significant amount of electrostatic energy, or static electricity, during contact with the animal in the grooming process, particularly in drier climates and during drier times of the year. Second, many of the known grooming devices fail to allow for a full range of motion of the user's grooming hand and fingers, thereby making grooming more arduous for the user and uncomfortable for the animal. Third, many of the known devices are also incapable of performing a thorough and complete grooming of the animal due to the lack of dexterity and reach on the part of the user.

For example, many traditional grooming brushes have rigid handles and sharp edges, which are conducive to build-ups of static electricity. As such, the rigid shape and sharp edges may cause pain or discomfort to the animal due to inadvertently rough contact with the animal during grooming, and there is an additional possibility of delivering an electrostatic shock as the brush comes into contact with the animal. Furthermore, a traditional grooming brush lacks the flexibility to provide a thorough grooming and does not allow for the user to maintain dexterity in his or her grooming hand. Thus, the user cannot groom the animal in hard-to-reach places, cannot use both hands to keep the animal steady, and cannot use both hands to pick up cleaning supplies or other items as may be necessary during the grooming process.

In addition to a traditional grooming brush with a rigid handle, there also exist different types of grooming gloves with various types of abrasive textured material portions on the fingers of the glove and/or on the palm that are utilized in brushing and combing the animal. In contrast to traditional grooming brushes, the grooming gloves attempt to provide more dexterity for the user and avoid the cumbersome nature of the traditional grooming brush. Nonetheless, many grooming gloves still suffer from failing to allow for adequate hand and finger freedom of movement and failing to eliminate the danger of electrostatic shock to the animal during the grooming process.

Furthermore, none of the known grooming devices, including both traditional brush and glove designs, have adequate bristle structures, nor are they comprised of effective materials to enable the user to conduct a competent grooming of an animal without causing pain or discomfort.

What is needed is an animal grooming device with an improved design that avoids the cumbersome nature of the aforementioned traditional brush and grooming glove designs, allows for flexibility and freedom of movement of the user's grooming hand and fingers, and reduces the effects of electrostatic shock to the animal during the grooming process.

SUMMARY OF THE INVENTION

The subject matter described and claimed herein relates to an improved device to be worn on a human hand, such as a glove, wherein said device is adjustable for fit and useful for grooming the hair or fur on an animal, including, but not limited to horses, dogs, cats, and cows.

The device comprises a material specifically designed to reduce or effectively eliminate static electricity buildup and discharge when used to groom the animal.

The device further comprises surface members, such as protrusions, ribbing, finger-nail-like structures, and/or bristles, to facilitate extraction and removal of unwanted fur, hair, or other extraneous debris from the animal.

The device may be adjustable such that the user may customize the tightness of fit of the device on the user's hand.

Moreover, the device comprises one or more digit coverings, such as the fingers on a glove, to enable the user ample dexterity to maneuver the device with care around the eyes, nose, ears, and other hard-to-reach and sensitive areas on the animal that requires grooming.

The reduction of static buildup through use of the appropriate materials reduces the trauma, stress, pain, and discomfort to the animal during the grooming process and enables the user to complete his or her task of caring for the animal. Additionally, the ability to a) maneuver the device into hard to reach places; b) effectively use two hands on the subject; c) have a molding fit; d) reach under coat; e) effectively massage; f) wipe and clean sensitive areas; g) perform other tasks while or between grooming; and h) tightly fit around the wrist of the user with the use of a Velcro or other type of fastener represents a marked improvement over the presently known grooming devices.

DETAILED DESCRIPTION OF THE INVENTION

Figure 1:
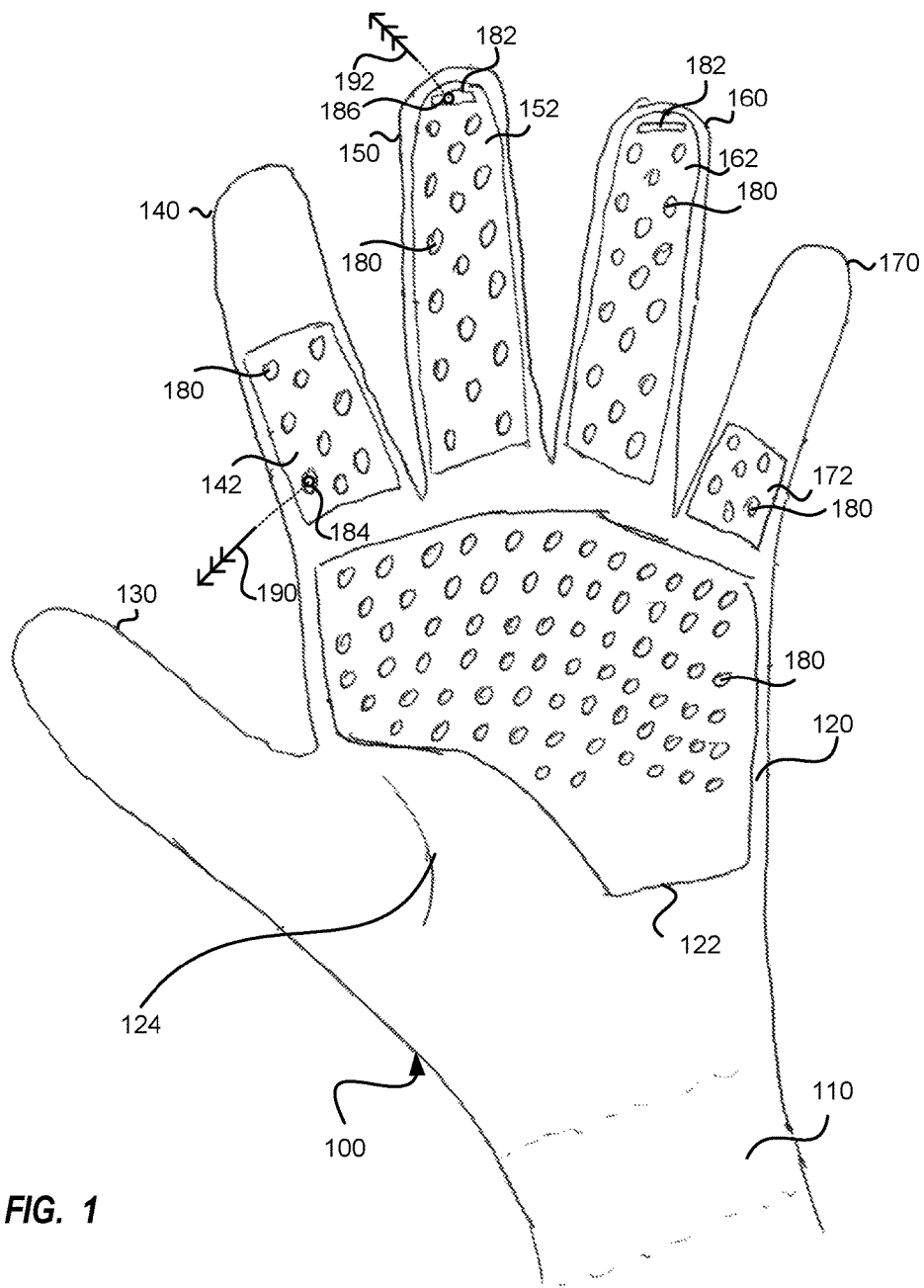
FIG. 1 illustrates a front of an example grooming device, according to one embodiment.

FIG. 1 illustrates a front view of an example grooming device, according to one embodiment. The grooming device includes a glove 100 having grooming members molded onto a palm side surface of the glove 100 (discussed in more detail later). The glove 100 includes a wrist portion 110, a palm portion 120, and digit portions including a thumb portion 130, index finger portion 140, middle finger portion 150, ring finger portion 160, and pinky finger portion 170.

The wrist portion 110 may secure tightly around a user's wrist. The wrist portion 110 may be made of a material that conforms to the user's wrist by its nature (e.g., expands and retracts as needed). The materials that may be utilized for the wrist portion 110 include, but are not limited to, nylon, neoprene, nitrile, spandex or some combination thereof. The wrist portion 110 may secure tightly around the user's wrist using some type of fastening means (not separately illustrated). The fastening means may include, but is not limited to, Velco®, snaps, draw strings, ties, hooks, loops or some combination thereof. The palm portion 120 extends from the wrist portion 110 and encloses a user's palm. The palm portion 120 connects to the digit portions 130, 140, 150, 160, 170 that enclose a user's thumb, index finger, middle finger, ring finger, and pinky finger.

The glove 100 may be selected from a class of various gloves customary in the industry. The glove 100 may be made to match size standards customary in the industry or be custom-made to fit a particular user's hand size. The glove 100 may be made to fit either the left or right hand. The glove 100 may be manufactured from various materials. Preferably, the glove 100 is made from materials having anti-static properties to eliminate, or at least significantly reduce, static charge buildup and discharge caused by friction during contact.

The glove 100 may be made of various materials including, but not limited to, carbon fiber, para-aramid synthetic fiber, poly-paraphenylene tereph thalamide, nylon, neoprene, nitrile, or spandex. The glove 100 may be made from or contain additional materials employing agents with long-chain aliphatic ethoxylated and nonethoxylated amines and amides, quaternary ammonium salts, including, but not limited to, behentrimonium chloride or cocamidopropyl betaine, esters of phosphoric acid, polyethylene glycol esters, or polyols.

The glove 100 may also consist at least partially of conductive polymers, like PEDOT-PSS and conducting polymer nanofibers, including, but not limited to, polyaniline nanofibers. Low loading levels of conducting polymers (e.g., one to five percent of the total weight), may effectively dissipate electrostatic charge in coatings and textiles, leading to anti-static applications in microelectronics, fabrics, and carpeting.

The glove 100 can be made at least partially from materials that retain more moisture in order to further reduce buildup and discharge of static electricity. Such materials include, but are not limited to, rag wool, nylon, and cotton.

At least a portion of the glove 100 may be dipped in TPU plastic, other antistatic polyurethane plastic or nitrile to provide for increased gripping as well as providing anti-static properties.

In addition to, or in place of, being made from anti-static materials such as those listed above, the glove 100 could be treated with a supplemental anti-static agent such as a spray, vapor, or liquid solution to reduce or eliminate the static buildup in the invention during the grooming process. Such spray, vapor, or liquid solution must be of a type, or consist from such materials, as is safe for contacting the skin or coat of the animal and is preferably made from natural or hypoallergenic components.

Molded to the palm portion 120 and the digit portions 140, 150, 160, 170 are grooming members 122, 142, 152, 162, 172. Each of the grooming members 122, 142, 152, 162, 172 may include a plurality of protrusions 180. The grooming members 122, 142, 152, 162, 172 may be made from various materials, including, but not limited to, polyelatomers, rubber, TPU plastic, thermoplastic elastomer, PVC, and nitrile. The molding of the grooming members 122, 142, 152, 162, 172 to the glove 100 will be discussed in more detail later.

The protrusions 180 are to brush and collect different types of extraneous debris and loose hair from the coat of the animal. The protrusions 180 are illustrated as being circular (cylindrical in three dimension), but are not limited thereto. Rather, the protrusions 180 may be any other shape that provides the desired result, including, but not limited to, ovals, bars, curves and cones. The height, width (diameter), spacing, frequency, number, and/or pattern of the protrusions 180 may vary depending on amongst other things, the type of animal (e.g., dog, horse) and the type of coat (e.g., long hair, short hair).

As illustrated, the protrusions 180 have approximately the same shape, pattern and spacing on each of the grooming members 122, 142, 152, 162, 172 but is in no way limited thereto. Rather, the protrusions 180 may vary in shape, height, width, spacing, frequency, number, and/or pattern within one or more of the grooming members 122, 142, 152, 162, 172 and/or between one or more of the various grooming members 122, 142, 152, 162, 172.

According to one embodiment, at least a subset of the protrusions 180 may include holes 184 therein (only one illustrated, on the grooming member 142 covering the index finger portion 140, for ease of illustration) to receive bristles, brushes or the like 190 (only one illustrated as being inserted in the only one illustrated hole 184) after the grooming members 122, 142, 152, 162, 172 are molded onto the glove 100. The type and size of the bristles/brushes 190 may be determined based on the use of the grooming device.

As illustrated, the thumb portion 130 of the glove 100 does not include a grooming member. This is to provide a user's thumb with freedom to move about (dexterity), to grab items, and/or to have a free surface to touch an animal (e.g., clean an animal's eyes). The grooming device is not limited to not having a grooming member on the thumb portion 130 of the glove 100. According to one embodiment, the thumb portion 130 of the glove 100 may include a grooming member on at least a portion thereof.

Furthermore, as illustrated the grooming member 122 is shaped so as to not cover a portion 124 of the palm portion 120 of the glove 100. The portion 124 not covered is the portion where a user's thumb and palm are connected (e.g., the thumb joint 124). Not covering the thumb joint 124 with the grooming member 122 provides a user with more freedom to rotate their thumb (more dexterity). The grooming member 122 extends further down the side of the palm portion 120 opposite the thumb portion 130 and extends up to just below a connection to the digit portions 140, 150, 160, 170. According to one embodiment, the grooming member 122 may extend over at least a portion of the thumb joint 124 (such an embodiment may provide additional grooming surface at the cost of decreased dexterity).

As illustrated, the grooming members 152, 162 cover substantially the entire digit portions 150, 160 as they extend from just above the connection to the palm portion 120 to the end of the digit portions 150, 160. In addition to the protrusions 180 that are illustrated as being circular, the grooming members 152, 162 also include elongated protrusions 182. The elongated protrusions 182 are located at far end (distal phalanx) of the grooming members 152, 162 (end of digit portions 150, 160) and extend substantially along width thereof. According to one embodiment, the elongated protrusions 182 may also extend down sides of the grooming members 152, 162. The elongated protrusions 182 are illustrated as being oblong but are not limited thereby. As illustrated, the grooming members 152, 162 each include a single elongated protrusion 182 but are not limited thereby as more than one elongated protrusion 182 may be included at an end of at least one of the grooming members 152, 162. The height of the elongated protrusions 182 may be the same as the height of the protrusions 180 or may extend higher. The elongated protrusions 182 are to enable the user to perform a deeper and more thorough grooming of the animal's coat and/or to groom hard-to-reach places on the animal's body, including, but not limited to, excavating the animal's ears.

According to one embodiment, at least a subset of the elongated protrusions 182 may include holes or a slot 186 formed therein (only one illustrated, on the grooming member 152, for ease of illustration) to receive bristles, brushes, a rigid material or the like 192 (only one illustrated as being inserted in the only one illustrated hole 186) after the grooming members 152, 162 are molded onto the glove 100. The type and size of the items placed in the holes/slots 186 may be determined based on the use of the grooming device. The rigid material 192 that may be utilized may include, but is not limited to, plastic, carbon fiber, collagen-based material, metal, polyurethane plastic, PVC, rubber, and neoprene.

As illustrated, the grooming members 142, 172 cover only a portion (e.g., proximal phalanx and middle phalanx) of the index finger portion 140 and the pinky finger portion 170. The portion of the index finger portion 140 and the pinky finger portion 170 covered by the grooming members 142, 172 may be the same or may be different. The uncovered portions of the index finger portion 140 and the pinky finger portion 170 allow for increased dexterity and tactility in those fingers for gripping and holding smaller objects. Furthermore, it may also allow for grooming small or sensitive areas of the animal, such as around the eyes, ears, nose, and mouth. The amount of the index finger portion 140 and the pinky finger portion 170 is not limited to any set amount and may vary based on the use of the glove 100. According to one embodiment, the pinky finger portion 170 may be completely covered by the grooming member 172 so that only the thumb portion 130 and the index finger portion 140 have portions free of grooming members and may be used to more easily secure items therebetween.

According to one embodiment, one or more of the grooming members 142, 152, 162, 172 may include one or more bending seams (not separately illustrated) at the phalangeal joints (e.g., knuckles). The bending seams increase dexterity and flexibility in the fingers of the user by decreasing the glove's 100 resistance to bending due to the grooming members 142, 152, 162, 172. According to one embodiment, one or more of the grooming members 142, 152, 162, 172 may be a plurality of grooming members so that the grooming member does do not cover the joints of a user thus further increasing the dexterity.

The grooming device is not limited to the illustrated configuration having a plurality of grooming members molded to the glove 100 in a certain fashion. Rather, the grooming device may include one or more grooming member molded to the glove 100 to cover various portions of the glove 100 without departing from the current scope. For example, different fingers may be fully covered, partially covered, or not covered by the grooming members.

Figure 2:
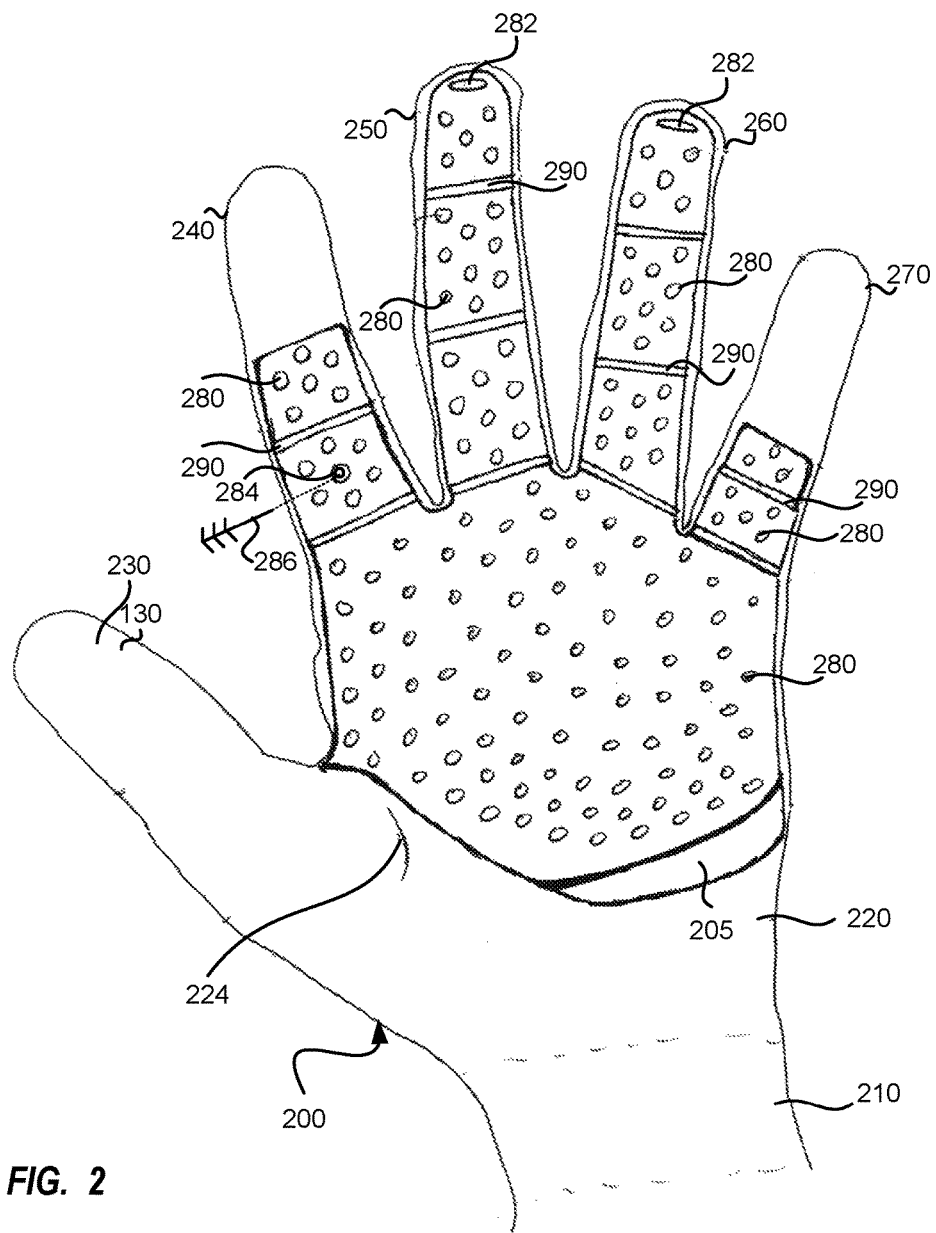
FIG. 2 illustrates a front view of an example grooming device, according to one embodiment.

FIG. 2 illustrates a front view of an example grooming device, according to one embodiment. The grooming device includes a glove 200 having a wrist portion 210, a palm portion 220, and digit portions including a thumb portion 230, index finger portion 240, middle finger portion 250, ring finger portion 260, and pinky finger portion 270. The glove 200 is at least similar to the glove 100 and may be made of the same or similar materials.

The grooming device also includes a grooming member 205 molded to the glove. The grooming member 205 is at least similar to the grooming members 122, 142, 152, 162, 172 and may be made of the same or similar materials. As illustrated, the grooming member 205 covers at least a portion of palm portion 220 and the digit portions 240, 250, 260, 270 of the glove 200. The grooming member 205 may include a plurality of protrusions 280. The protrusions 280 are to brush and collect different types of extraneous debris and loose hair from the coat of the animal. According to one embodiment, at least a subset of the protrusions 280 may include holes 284 therein (only one illustrated for ease of illustration) to receive bristles, brushes or the like 286 after the grooming member 205 is molded onto the glove 200.

As illustrated, the grooming member 205 does not cover the thumb portion 230 of the glove 200 to provide a user's thumb with freedom to move about (dexterity), to grab items, and/or to have a free surface to touch an animal (e.g., clean an animal's eyes). Furthermore, as illustrated the grooming member 205 is shaped so as to not cover a portion 224 of the palm portion 220 of the glove 200 where a user's thumb and palm are connected (e.g., the thumb joint 124) to provide a user with more freedom to rotate their thumb (more dexterity).

As illustrated, the grooming member 205 covers substantially the entire digit portions 250, 260 and also include elongated protrusions 282 located at an end (distal phalanx) of the digit portions 250, 260 and extend substantially along top edges thereof to enable the user to perform a deeper and more thorough grooming of the animal's coat and/or to groom hard-to-reach places on the animal's body.

As illustrated, the grooming member 205 covers only a portion (e.g., proximal phalanx and middle phalanx) of the index finger portion 240 and the pinky finger portion 270 to allow for increased dexterity and tactility in those fingers for gripping and holding smaller objects.

As illustrated, the grooming member 205 includes bending seams 290 at the phalangeal joints (e.g., knuckles). The bending seams 290 increase dexterity and flexibility in the fingers of the user by decreasing the glove's 200 resistance to bending due to the grooming member 205.

According to one embodiment, the grooming members 122, 142, 152, 162, 172 or the grooming member 205 may be molded directly to the glove 100, 200 so that the material of the grooming members essentially fuses with the material of the glove 100, 200 and the grooming device essentially becomes a single unit. This is advantageous to an embodiment where the grooming members are formed separately and then secured to the glove via, for example, gluing, suing, welding, heating or the like as those arrangements are susceptible to separation.

The mold used to mold the grooming members 122, 142, 152, 162, 172, 205 directly to the glove 100, 200 may include a back plate that is placed within the glove 100/200 and one or more top plates that go over the glove and form the mold on the appropriate portions of the glove 100/200. In this manner when the mold is formed it is formed right on the glove and the process causes the grooming members 122, 142, 152, 162, 172, 205 to mesh with the material of the glove 100/200. One skilled in the art would understand the molding process.

Figure 3:
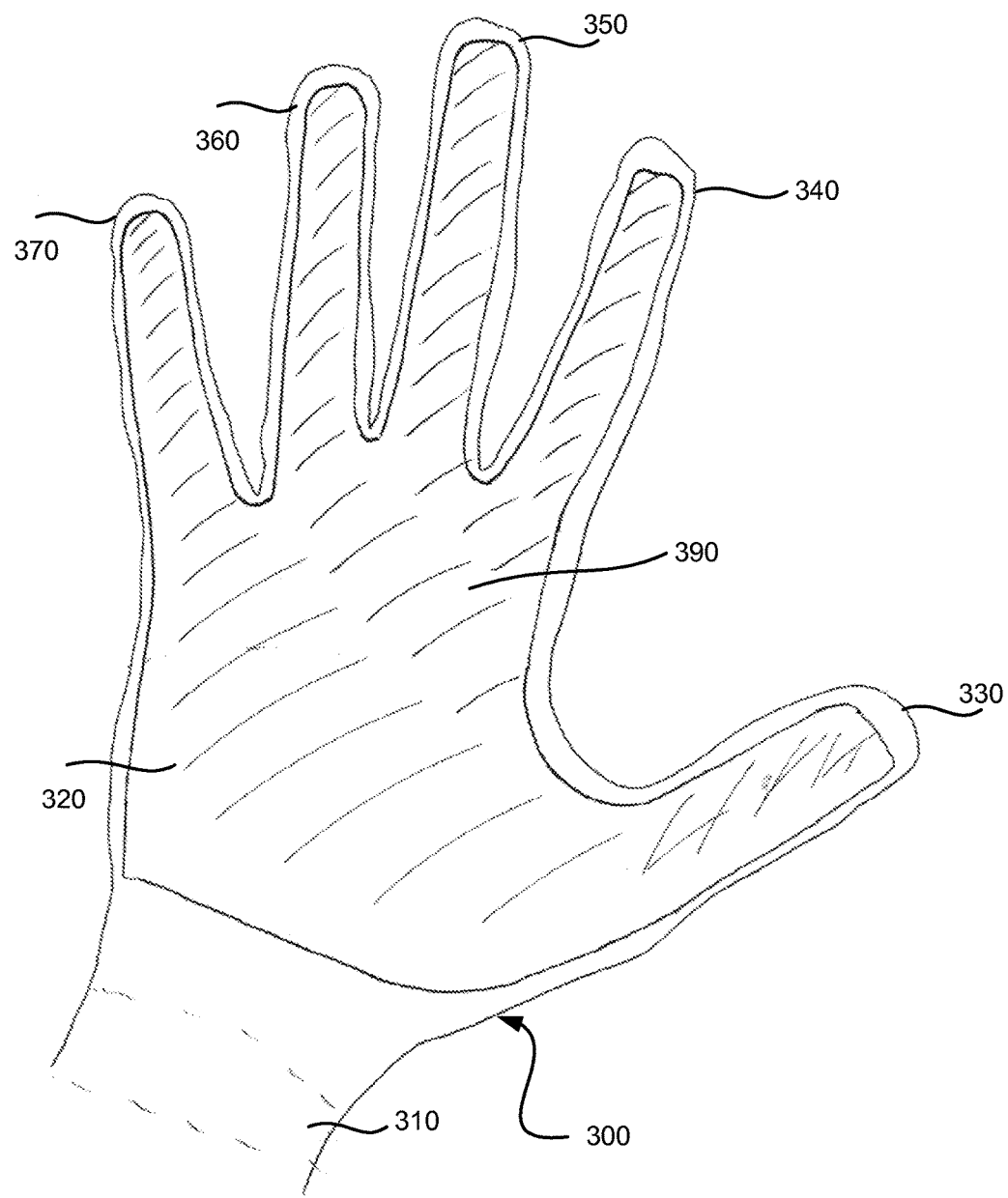
FIG. 3 illustrates a rear view of an example grooming device, according to one embodiment.

FIG. 3 illustrates a back view of an example grooming device (e.g., the grooming device of FIG. 1 or FIG. 2), according to one embodiment. The grooming device includes a glove 300 having a wrist portion 310, a palm portion 320, a thumb portion 330, an index finger portion 340, a middle finger portion 350, a ring finger portion 360, and a pinky finger portion 370. The back of the glove 300 may not include any grooming members (e.g., 122, 142, 152, 162, 172, 205) as these may be reserved for the front (palm side) of the glove 300. The back of the glove 300 may have a portion 390 that includes a soft material (soft material portion 390). The soft material may be made from various soft and/or absorbent materials including, but not limited to, Nylon, felt, silk, fleece, absorbent cotton, dyneema, rag wool and chamois material. The soft material enables the back of the glove 300 to provide additional grooming for more sensitive portions of the animal or to sooth the animal. As illustrated, the soft material portion 39 covers substantially the whole back of the glove including the palm portion 320, the thumb portion 330, the index finger portion 340, the middle finger portion 350, the ring finger portion 360, and the pinky finger portion 370. However, the configuration of the soft material portion 390 is not limited thereby. Rather, the soft material portion 390 can cover a portion of the back of the glove 300 including a portion of the palm portion 320, a subset of the digit portions (not cover all digits), and/or a portion of one or more of the digit portions without departing from the current scope.

The soft material may be part of the glove 300 or may be connected to the glove 300.

Figure 4:
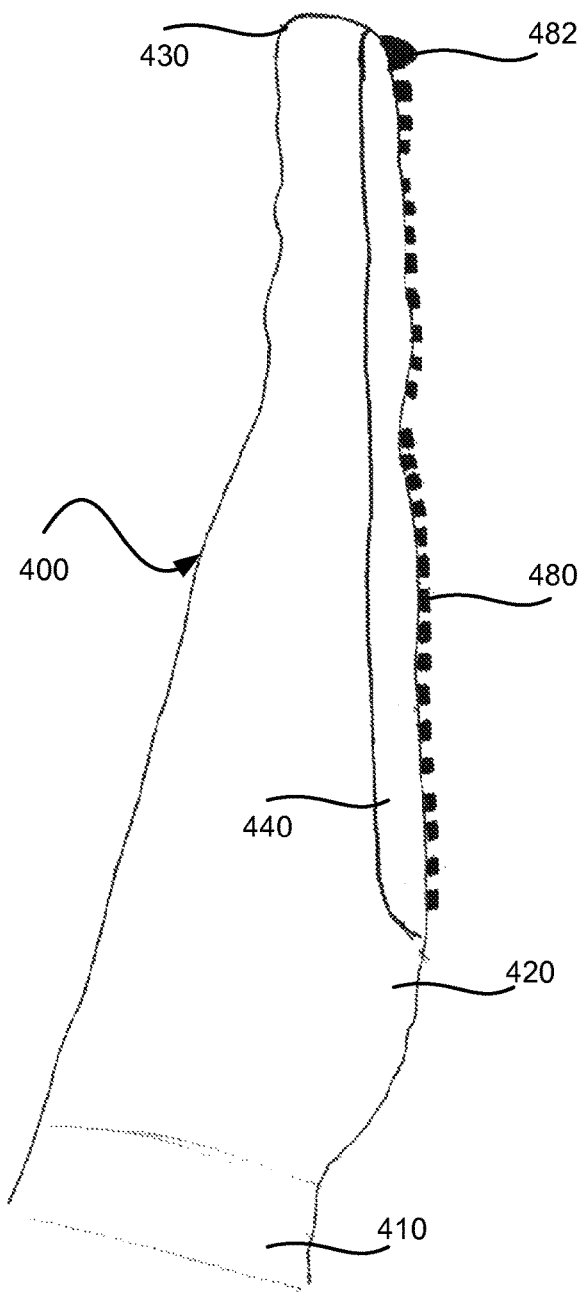
FIG. 4 illustrates a side view of an example grooming device, according to one embodiment.

FIG. 4 is a side view of an example grooming device (e.g., the grooming device of FIG. 1 or FIG. 2), according to one embodiment. The grooming device includes a glove 400, having a wrist portion 410, the palm portion 420, and digit portions 430 (individual digits not separately displayed). The grooming device also including one or more grooming members 440 (e.g., 122, 142, 152, 162, 172, 205) having protrusions 480, 482 (e.g., 180, 182, 280, 282). The protrusions 480 are located on the palm portion 420 and digit portions 430 while the protrusions 482 are located at tips of one or more digit portions 430.

The protrusions 480, 482 may vary in number, frequency, and size, including height and width, in addition to shape, depending on the animal sought to be groomed or the type of cleaning technique, process, or area sought to be cleaned.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A device for grooming the coat of fur-bearing animals, the device comprising:
   a glove having a palm and fingers to fit on and cover a human hand including a palm and fingers of the human hand, wherein the glove is made of materials that limit static buildup, wherein limiting the static buildup reduces potential of shocking the animals when using the device for grooming; and
   a grooming pad affixed onto a palm side of the glove, wherein the grooming pad includes a plurality of protrusions formed thereon to groom the fur-bearing animals, wherein the grooming pad covers a portion of the palm of the glove and a subset of the fingers of the glove including only a lower portion of a pinky finger, substantially whole length of a ring finger, substantially whole length of a middle finger, and only a lower portion of an index finger.

2. The device of claim 1, wherein the grooming pad further includes at least one elongated protrusion on each of the ring finger and the middle finger of the glove, wherein the at least one elongated protrusion is located at a far end, opposite where a finger nail of the human hand would be located when the human hand is within the glove, of each of the ring finger and the middle finger of the glove and extends substantially from one side of each of the ring finger and the middle finger to other side of each of the ring finger and the middle finger.

3. The device of claim 1, wherein the grooming pad includes creases formed therein on the subset of the fingers of the glove, wherein the creases are located at finger joints of the subset of the fingers of the glove and run laterally across the grooming pad from one side of the fingers to another side of the fingers, wherein the creases have less thickness than other portions of the grooming pad.

4. The device of claim 1, wherein the plurality of protrusions are located on the subset of the fingers of the glove excluding at finger joints of the subset of the fingers of the glove.

5. The device of claim 1, wherein
   the portion of the palm of the glove covered by the grooming pad excludes a thumb joint of the glove, wherein the thumb joint of the glove is a portion of the glove that covers a portion of the palm of the human hand connected to a thumb of the human hand that moves with the thumb when the thumb is rotated inward in order to provide dexterity to the thumb, and
   the subset of the fingers of the glove covered by the grooming pad does not include the thumb of the glove.

6. A device for grooming the coat of fur-bearing animals, the device comprising:
   a glove having a palm and fingers to fit on and cover a human hand including a palm and fingers of the human hand, wherein the glove is made of materials that limit static buildup, wherein limiting the static buildup reduces potential of shocking the animals when using the device for grooming; and
   a grooming pad affixed to a palm side of the glove and configured to cover a portion of the palm and a subset of the fingers of the glove including substantially a whole length of a ring finger and a whole length of a middle finger, wherein the grooming pad includes a plurality of first protrusions located on the portion of the palm and each of the subset of the fingers and at least one second protrusion located on each of the ring finger and the middle finger, wherein the at least one second protrusion is located at a far end, opposite where a finger nail of the human hand would be located when the human hand is within the glove, of each of the ring finger and the middle finger and extends substantially from one side of each of the ring finger and the middle finger to other side of each of the ring finger and the middle finger.

7. The device of claim 6, wherein the subset of the fingers covered by the grooming pad further includes only a lower portion of a pinky finger and only a lower portion of an index finger.

8. The device of claim 6, wherein the portion of the palm of the glove covered by the grooming pad excludes a thumb joint of the glove, wherein the thumb joint of the glove is a portion of the glove that covers a portion of the palm of the human hand connected to a thumb of the human hand that moves with the thumb when the thumb is rotated inward and the subset of the fingers of the glove covered by the grooming pad does not include the thumb of the glove.

9. The device of claim 6, wherein the plurality of protrusions are located on the subset of the fingers of the glove excluding at finger joints of the subset of the fingers of the glove.

10. The device of claim 6, wherein the grooming pad includes creases formed therein on the subset of the fingers, wherein the creases are located at finger joints of the subset of the fingers and run laterally across the grooming pad from one side of the subset of the fingers to another side of the subset of the fingers, wherein the creases have less thickness than other portions of the grooming pad.

11. A device for grooming a coat of fur-bearing animals, the device comprising:
a glove having a palm and fingers to fit on and cover a human hand including a palm and fingers of the human hand, wherein the glove is made of materials that limit static buildup, wherein limiting the static buildup reduces potential of shocking the animals when using the device for grooming; and
at least one grooming pad affixed onto a palm side of the glove, wherein the at least one grooming pad is configured to cover a portion of the palm of the glove, wherein the portion of the palm excludes a thumb joint of the glove, wherein the thumb joint of the glove is a portion of the glove that covers a portion of the palm of the human hand connected to a thumb of the human hand that moves with the thumb when the thumb is rotated inward toward the palm and other fingers, wherein the at least one grooming pad is configured to cover a subset of the fingers of the glove, wherein the subset of the fingers excludes the thumb, wherein the subset of the fingers includes at least one of a middle finger and a ring finger and at least one of an index finger and a pinky finger, wherein the grooming pad is configured to cover substantially an entire length of the at least one of the middle finger and the ring finger and only a lower portion of the at least one of the index finger and the pinky finger, wherein the at least one grooming pad includes a plurality of protrusions formed thereon to groom the fur-bearing animals, and wherein the at least one grooming pad further includes at least one elongated protrusion on the at least one of the middle finger and the ring finger, wherein the at least one elongated protrusion is located at a far end, opposite where a finger nail of the human hand would be located when the human hand is within the glove, and extends substantially from one side of the at least one of the middle finger and the ring finger to other side of the at least one of the middle finger and the ring finger.

12. The device of claim 11, wherein the subset of the fingers of the glove includes the index finger, the middle finger and the ring finger.

13. The device of claim 11, wherein the subset of the fingers of the glove includes the pinky finger, the middle finger and the ring finger.

14. The device of claim 11, wherein the subset of the fingers of the glove includes the pinky finger, the middle finger and the index finger.

15. The device of claim 11, wherein the at least one elongated protrusion includes at least one elongated protrusion located on each of the ring finger and the middle finger of the glove.

16. The device of claim 11, wherein the at least one grooming pad includes creases formed therein on the subset of the fingers, wherein the creases are located at finger joints of the subset of the fingers and run laterally across the at least one grooming pad from one side of the subset of the fingers to another side of the subset of the fingers, wherein the creases have less thickness than other portions of the at least one grooming pad.

17. The device of claim 11, wherein the at least one grooming pad is made of anti-static material.

18. The device of claim 11, wherein the at least one grooming pad includes a grooming pad for the palm of the glove and individual grooming pads for each of the subset of the fingers of the glove, wherein the grooming pad for the palm and the individual grooming pads for the fingers are not connected.

19. The device of claim 11, wherein the at least one grooming pad includes a single grooming pad for the palm and each of the subset of the fingers of the glove.

20. The device of claim 11, wherein the at least one grooming pad is molded directly onto the palm side of the glove, wherein the molding of the at least one grooming pad directly to the glove essentially fuses the glove and the at least one grooming pad together so they become a single unit, and wherein the protrusions are formed when the at least one grooming pad is molded.

* * * * *